…

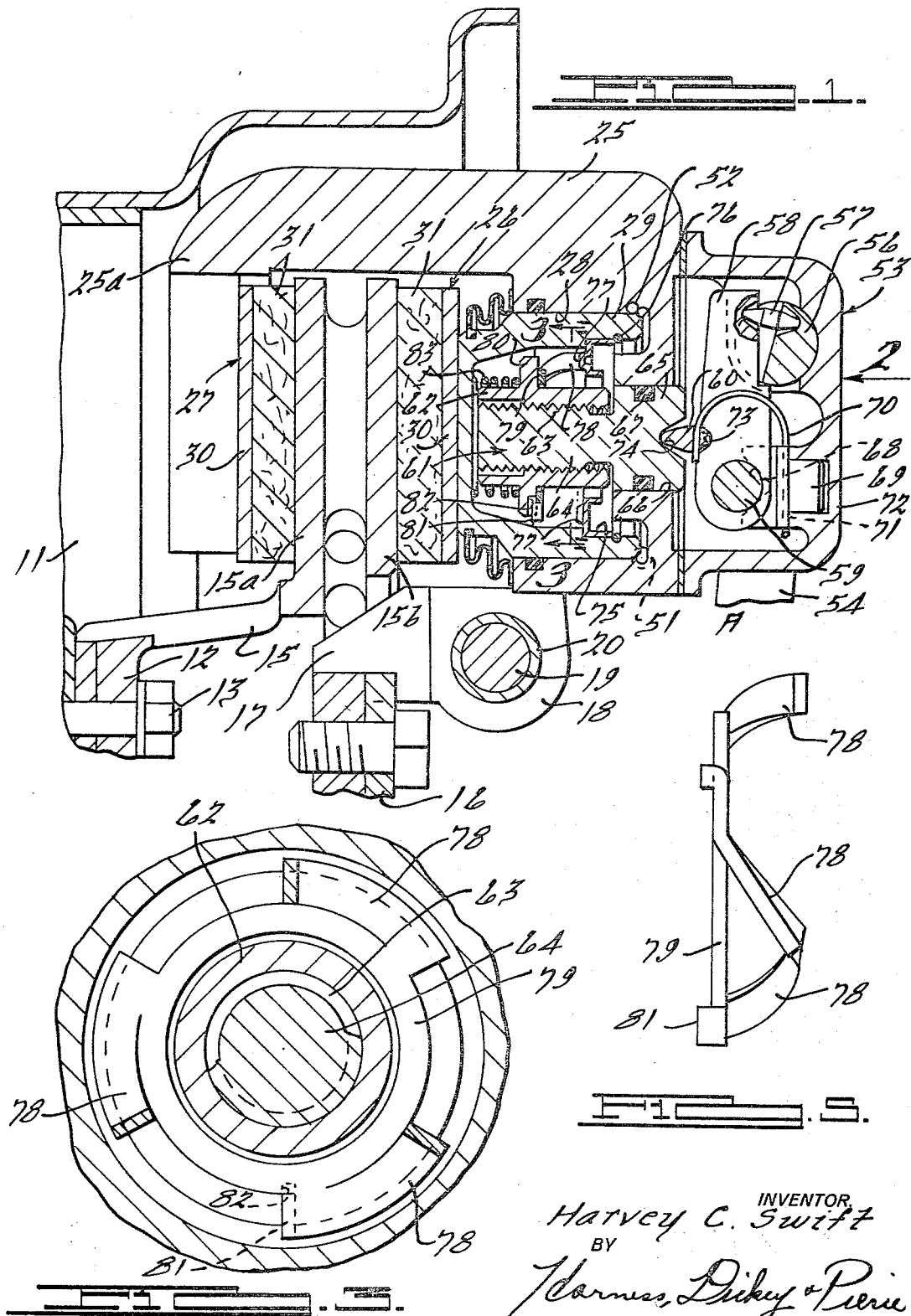

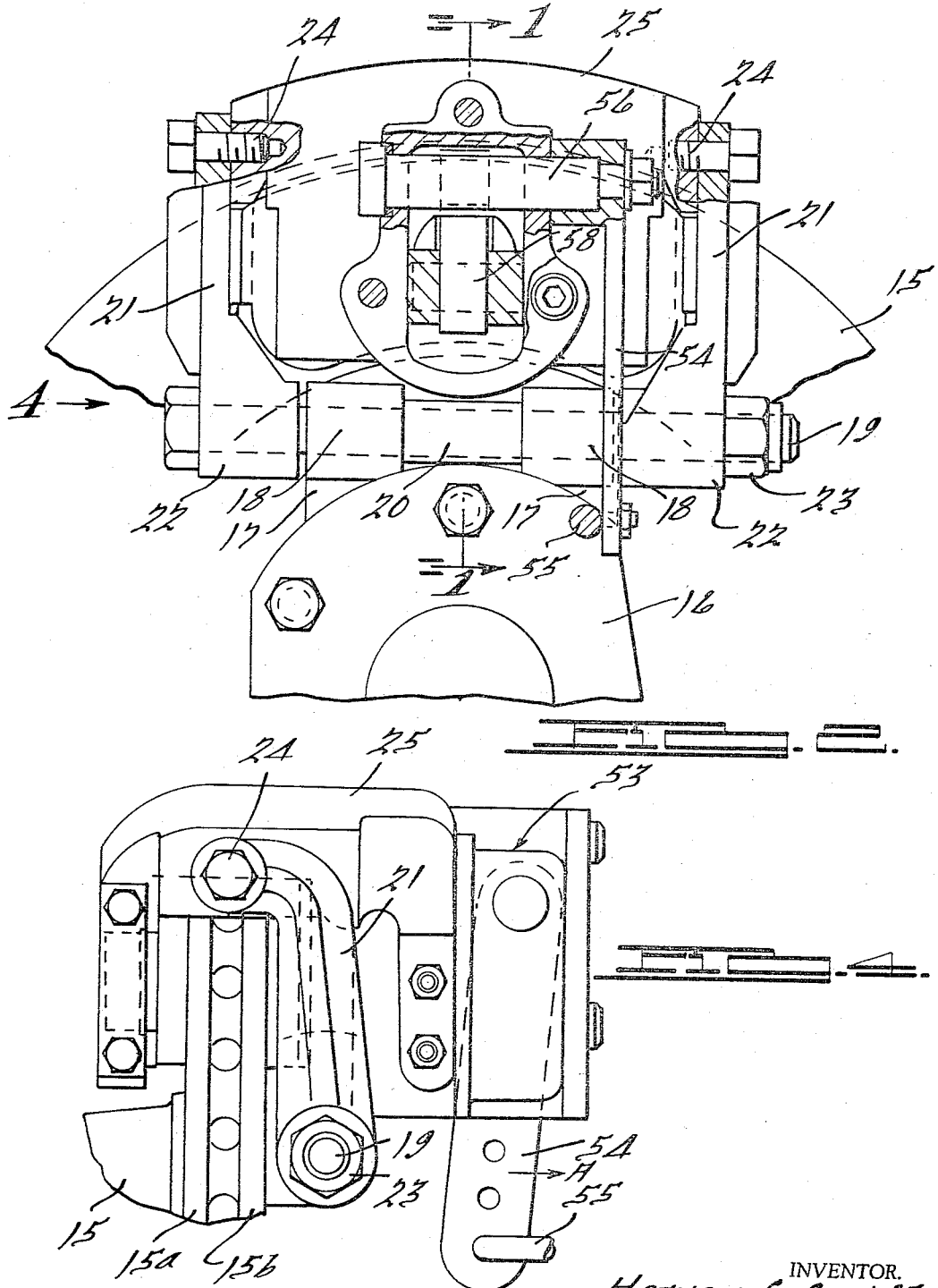

United States Patent Office 3,331,472
Patented July 18, 1967

3,331,472
ADJUSTING MEANS FOR DISK BRAKE
Harvey C. Swift, Birmingham, Mich., assignor to Kelsey-Hayes Company, Romulus, Mich., a corporation of Delaware
Filed Dec. 16, 1965, Ser. No. 514,345
8 Claims. (Cl. 188—73)

ABSTRACT OF THE DISCLOSURE

An adjuster for hydraulically operated disk brakes of the type having an axially movable caliper or housing. The adjuster periodically reestablishes the "Off" position of the housing to compensate for wear on the brake linings. The adjuster includes an extensible assembly located between the main brake applying piston and a mechanically operated lever forming a part of the parking brake linkage. When the piston is operated hydraulically, it carries spring fingers with it against a threaded sleeve forming a part of the adjustable assembly. If the piston moves sufficiently the spring fingers will rotate the sleeve to elongate the extensible assembly.

---

This invention relates to disk type brakes and, more particularly, to a combined hydraulic and mechanical brake and to improvements therein tending to simplify, render more efficient, and to improve generally brakes of this type.

It is a primary object of this invention to provide a hydraulically operated disk brake having a mechanically operated parking or emergency brake combined therewith in such a manner that each brake actuating mechanism may be operated independently of the other and wherein the combined brakes and actuating means therefor are consolidated and assembled into a unit which may be economically manufactured, quickly and easily assembled and installed, and in which maintenance costs are reduced to a minimum.

Another object of the invention is to provide a mechanical brake actuating means which is associated with the hydraulically operated portion of the brake in such a manner that the same brake actuating piston may be employed for actuating the brakes both hydraulically and mechanically.

Another object of the invention is to provide means, operable when the brake is actuated hydraulically, to adjust the position of the brake actuating piston to compensate for wear on the brake shoe linings.

The various objects and advantages, and the novel details of construction of one commercially practical embodiment of the invention, will become more apparent as this description proceeds, especially when considered in connection with the accompanying drawings, in which:

FIGURE 1 is a fragmentary sectional view taken substantially on the plane indicated by line 1—1 in FIGURE 2, with a portion of the wheel indicated in full lines;

FIGURE 2 is a sectional elevational view looking in the direction of arrow 2 in FIGURE 1, with certain of the parts broken away;

FIGURE 3 is an enlarged sectional view taken substantially on the plane indicated by line 3—3 in FIGURE 1;

FIGURE 4 is a side elevational view looking in the direction of arrow 4 in FIGURE 2; and FIGURE 5 is a detail elevational view of the spring member.

The brake of this invention is shown as being associated with a vehicle wheel body 11 secured to the axle flange 12 by means of studs or bolt and nut assemblies 13. Also secured to the axle flange 12 by means of the same studs or bolt and nut assemblies 13, for rotation with the wheel body 11, is a brake disk 15. The brake disk 15 is of the ventilated type having spaced walls 15a and 15b.

Secured to a fixed part 16 of the axle structure is a torque member 17. Attached to the torque member 17 are spaced sleeve-like members 18 through which a shaft or rod 19 extends. A spacer sleeve 20 is positioned on this rod between the sleeves 18. The reference character 21 indicates a pair of links having bearings or journal portions 22 rotatably mounted on the rod or shaft 19. The bearings or journals 22 are freely rotatable on the rod or shaft 19 and the whole assembly is secured in assembled relation, as shown in FIGURE 2, by means of a nut or the like 23 secured to the end of the shaft 19.

The upper free end of each link member 21 is freely pivoted or journaled as at 24 to a caliper-like member 25 which straddles a portion of the periphery of the brake disk 15. The pivotal supports 24 for the caliper-like member 25 are independent of one another so that independent pivotal movement of the caliper 25 on the pivots 24 is possible. The pivotal supports 24 are in alignment with one another transversely of the caliper and are arranged in radial alignment with the periphery of the rotor, whereby the caliper is pivotally supported equidistant from the braking surfaces of the brake disk.

One leg of the caliper 25 is provided with a recess 28 forming a cylinder to slidably receive a piston 29. When fluid under pressure is admitted to the cylinder 28, the piston 29 is moved to the left, as viewed in FIGURE 1, and engages the adjacent brake shoe 26 to move it against the rotor or brake disk 15. The reaction of this movement of the piston operates in an opposite direction to move the caliper 25 so that the other end 25a of the caliper moves against the other brake shoe 27 to force the same into engagement with the brake disk 15. Thus, both brakes are actuated simultaneously by the use of a single piston.

Each brake shoe is provided with a backing plate 30 carrying a friction lining 31 adapted to engage the braking surfaces 15a and 15b of the brake disk 15.

The brake shoes may be operated either hydraulically or manually, as shown in FIGURE 1. Fluid may be admitted behind the piston 29 through an inlet 51. The reference character 52 indicates a bleed opening.

The brake shoe 26 is engaged by the piston 29 to operate the brakes hydraulically and the brakes may also be operated mechanically by manually operated means indicated generally by the reference character 53. The manually controlled means is shown as comprising an operating lever 54 which may be connected by a link 55 to an operating handle (not shown). Movement of the lever in the direction of the arrow A will rotate the cam shaft 56 and through the connecting link 57 will move the lever 58 about its shaft 59 and through the connecting link 60 will move an extensible member 61 to the left to move the piston 29 to the left to apply the brakes.

The extensible member 61 comprises an outer sleeve portion 62 which has a threaded engagement as at 63 with a center plug-like portion 64. The right-hand end of the plug-like portion 64 terminates in a piston-like portion 65 which slides in a bore 66 in the caliper member 25. A sealing ring 67 is provided between the portion 65 and the bore 66 to provide a seal at this point.

The lever 58 has its pivot shaft 59 engaged in a V-shaped recess 68 formed in a member 69. A spring member 70 has one end engaging the connecting link 60, while its other end is secured in an aperture 71 in the wall of the enclosure 72. The spring member 70 will assist in holding the connecting link 60 in position to engage recesses 73 and 74 in the lever 58 and the member 61.

The sleeve-like portion 62 of the extensible member 61 is adapted to be rotated relative to the plug-like portion 64 to lengthen the member 61 so that the piston 29 may be moved a further distance to compensate for wear on the brake shoe linings 31. For this purpose, an annular member 75 is fixed within the piston 29 adjacent the open end thereof and held in place by a ring member 76 engaging a groove in the piston. The member 75 is provided with a plurality of teeth 77 adapted to be engaged by the ends of spring arms or fingers 78 carried by an annular washer-like or ring member 79. This ring member 79 surrounds the sleeve-like member 62 and engages an annular collar 80. The ring-like member 79 is non-rotatably mounted on the sleeve member 62 against the collar 80 by having a lug or lateral extension 81 thereof engaging in a recess 82 in the collar 80. A coil spring 83 engages the opposite side of the collar 80 and the end of this piston to normally bias the sleeve assembly or extensible member 61 towards the right.

As the brake linings become worn, it is necessary to adjust the sleeve-like member 62 on the inner plug-like portion 64 to lengthen this member so that the piston 29 will be moved a greater distance during each mechanical application of the brakes. This is accomplished by rotating the sleeve-like portion 62 on the inner plug-like portion 64. This rotative movement of the outer sleeve member 62 is accomplished by engagement of the rack 77 with the substantially axially extending spring arms 78 as the piston is moved to the left, as viewed in FIGURE 1. This bends the arms 78 toward the ring-like member 79 and exerts a rotative force on the sleeve member 62 through the engagement of the lug 81 with the recess 82 in the collar member 80. This will rotate the sleeve member 62 relative to the inner plug-like member 64 and thus lengthen the member 61. This will adjust the piston 29 closer to the adjacent brake shoe so as to take up all undesirable clearance between these parts. If the brake shoes have not worn sufficiently to require adjustment, the sleeve member 62 will not be adjusted.

While one commercially practical embodiment of the invention has been described and illustrated herein somewhat in detail, it will be understood that various changes may be made as may come within the purview of the accompanying claims.

What is claimed is:

1. In a disk brake for a wheel, a brake disk secured to said wheel for rotation therewith, a caliper straddling at least a portion of the periphery of said brake disk, a pair of opposed brake shoes, a first piston carried by said caliper for actuating said brake shoes, an extensible assembly having an adjustable part adapted to engage said piston and having a second piston slidably supported in said caliper, said second piston and said adjustable part being threadably connected, said pistons being relatively movable apart in response to fluid pressure, and means carried by said first piston operable upon said relative movement of said pistons to rotate said adjustable part relative to said second piston and thereby elongate said extensible member upon the hydraulic application of said brake.

2. In a disk brake for a wheel, a brake disk secured to said wheel for rotation therewith, a caliper straddling at least a portion of the periphery of said brake disk, a pair of opposed brake shoes, and a piston carried by said caliper for actuating said brake shoes, that improvement which comprises, an extensible member having an adjustable part adapted to engage said piston to move said piston to compensate for wear on the brake shoe linings, and means for adjusting said extensible member comprising, rack means carried by said piston, and a spring member connected to said adjustable part and engageable with said rack measn to adjust said adjustable part upon movement of said piston.

3. A device as described in claim 2, in which said spring member comprises a plurality of substantially axially extending spring arms adapted to engage said rack means.

4. A device as described in claim 3, in which said spring member comprises an annular portion surrounding said extensible member, and has a laterally extending lug on said annular portion engaging an aperture in the adjustable part of said extensible member to nonrotatably fix the same thereto.

5. A device as described in claim 2, in which the adjustable part of said extensible member is provided with an annular outwardly extending flange having a recess formed therein, and in which the spring member surrounds said adjustable part and is provided with a laterally extending part engaging the recess in said flange and is further provided with a plurality of substantially axially extending spring arms adapted to engage said rack means to rotate said adjustable part upon movement of said piston.

6. A device as described in claim 2, in which said extensible member comprises an inner plug-like portion and an outer sleeve-like portion adjustable on said inner plug-like portion, said inner portion having a piston-like portion at one end thereof slidably mounted in a bore formed in said piston.

7. A device as described in claim 2, in which the piston is provided with an annular toothed member fixed therein, and said extensible member is provided with a spring member having a plurality of spring arms engaging said toothed member whereby movement of said piston will cause an engagement of said spring arms with said toothed member to rotate the adjustable part of said extensible member to adjust the same.

8. The structure set forth in claim 1 in which said means includes a spring having a portion adapted to move angularly as said spring is compressed axially of the piston.

References Cited
UNITED STATES PATENTS 3,158,234 11/1964 Henderson _____ 188—196
3,244,260 4/1966 Frayer _____ 188—72

FOREIGN PATENTS 934,081 8/1963 Great Britain.

MILTON BUCHLER, *Primary Examiner.*

G. E. HALVOSA, *Assistant Examiner.*